United States Patent [19]

Hildebrandt

[11] 4,133,412

[45] Jan. 9, 1979

[54] SAW BUCK BRACKET AND SAW BUCK ASSEMBLY EMPLOYING SAME

[75] Inventor: William J. Hildebrandt, West Simsbury, Conn.

[73] Assignee: The Stanley Works, New Britain, Conn.

[21] Appl. No.: 859,290

[22] Filed: Dec. 12, 1977

[51] Int. Cl.² .............................................. F16M 11/00

[52] U.S. Cl. .................................... 182/154; 403/116; 248/164; 269/296

[58] Field of Search ................ 182/154, 155, 181-186, 182/225-227; 108/116, 117, 118; 248/164, 432; 269/296; 403/116

[56] References Cited

U.S. PATENT DOCUMENTS

| | | | |
|---|---|---|---|
| 633,233 | 9/1899 | Davis | 182/154 |
| 808,940 | 1/1906 | Meisel | 182/154 |
| 1,059,504 | 4/1913 | Teppert | 403/116 |
| 1,523,663 | 1/1925 | Slama | 182/154 |
| 2,174,952 | 10/1939 | Spikings | 182/155 |

FOREIGN PATENT DOCUMENTS

| | | | |
|---|---|---|---|
| 590281 | 7/1947 | United Kingdom | 182/154 |

*Primary Examiner*—Reinaldo P. Machado

[57] ABSTRACT

A saw buck bracket includes a pair of bracket elements disposed with their web portions in abutting surface contact and having parallel sidewall portions extending perpendicularly to their web portions along two opposite sides thereof. The web portions of the bracket elements have an arcuate slot with the slots of the cooperating bracket elements being disposed at opposite ends of the sidewall portions. Between the arcuate slots is a large diameter pivot provided by a circular aperture in one web portion and a circular lip on the other web portion which extends through and is secured behind the one web portion. Rivets seated in one web portion are slidable in the arcuate slot of the other to define the limits of pivoting of the bracketelements and to assist in maintaining the bracket elements in assembly. The bracket elements may also include locating flanges on the sidewall portions and are desirably provided with raised platforms in the web portions to provide the abutting surfaces and which are of a depth sufficient to accommodate the collars and heads of the various interconnecting means. In the saw buck assembly, the legs are secured between the sidewall portions of the bracket elements, and brace members extend between the leg members to space the bracket subassemblies apart.

15 Claims, 12 Drawing Figures

SAW BUCK BRACKET AND SAW BUCK ASSEMBLY EMPLOYING SAME

BACKGROUND OF THE INVENTION

Saw bucks are frequently employed for supporting logs and other large work objects thereon for sawing and shaping operations. It has heretofore been proposed to provide saw bucks in which the legs would be pivotably assembled as, for example, in Howard U.S. Pat. No. 103,335 granted May 24, 1870; Floyd U.S. Pat. No. 274,304 granted Mar. 20, 1883 and Meisel U.S. Pat. No. 808,940 granted Jan. 2, 1906. Various bracket structures have been proposed to provide pivotal connections for sawhorses and which would facilitate assembly of those sawhorses using conveniently available wood members such as 2 × 4 studs. Indicative of efforts in this area is Snyder U.S. Pat. No. 2,829,012 granted Apr. 1, 1958.

Generally, such brackets as have been employed in connection with the fabrication of sawhorses and saw bucks have required separate pivot elements and frequently separate stops to limit the pivotal movement of the legs and maintain the structure in the working position. In other arts, bracket structures have been proposed which would include in the bracket elements means for limiting the extent of pivotal movement such as, for example, the ironing board bracket of Lantz U.S. Pat. No. 2,498,588 granted Feb. 21, 1945 and the garment rack of De Marco U.S. Pat. No. 3,298,537 granted Jan. 17, 1967.

It is an object of the present invention to provide a novel saw buck bracket which may be simply and economically fabricated and which is rugged in construction to enable pivoting of the legs from a closed position for storage to a stable open position for working.

It is also an object to provide such a bracket which may be readily assembled with conveniently available wooden members to form the legs thereof and other wooden members to form the spacing and supporting braces.

Another object is to provide a saw buck assembly incorporating such bracket elements and readily available wooden members, and which assembly may be collapsed for storage and opened to provide a rugged, stable work surface.

SUMMARY OF THE INVENTION

It has now been found that the foregoing and related objects may be readily attained in a saw buck bracket which comprises a pair of bracket elements each having a web portion and parallel sidewall portions extending perpendicularly to the web portions along two opposite sides thereof. In the bracket, the web portions are disposed in abutting surface contact and the sidewall portions of the two bracket elements are generally aligned in the closed positon. The web portions of the bracket elements each have an arcuate slot therein and the chord of the slot extends perpendicularly to the sidewall portions. The slots of the bracket elements are disposed adjacent opposite ends of the sidewall portions so that the arcs extend towards each other in the closed position, and the web portions also have axially aligned circular apertures centrally thereof. One bracket web portion has a circular aperture of lesser diameter than that of the other and has an axially extending lip of circular cross section which is formed about its aperture. This lip extends through the aperture of the other bracket and has a collar on the free end thereof which extends along the surface of the other bracket web portion opposite that which abuts the first bracket web portion. A pair of fastener means are included in the bracket and each fastener means is fixedly seated in one of the bracket web portions and has a shank portion extending through the arcuate slot of the other bracket web portion and slidable therein. The fastener means has an end portion larger than the width of the cooperating slot so as to bear upon the surface of the web portion about the slot and thereby retain the bracket elements in assembly.

In the preferred embodiment, the web portions of the bracket elements have platform portions which extend above the plane of the body of the web portion adjacent the intersections with the sidewall portions, and these platform portions provide the abutting bearing surfaces therefor. Desirably, the platform portion is of generally rectangular configuration and of lesser dimension than the web portion so that the body provides a peripheral rib thereabout. The height of the platform is equal at least to the height dimension of the associated head and collar of the fastener means and the height dimension of the collar on the associated lip so that the collars and head do not protrude above the plane defined by the body of the web portions.

The axially extending lip on the one bracket portion desirably is dimensioned to snugly seat within the circular aperture of the other web portion and the collar should closely abut the surface of the bracket web portion to retain the bracket elements in tight fitting assembly. As will be appreciated, the collar is therefore of annular configuration in the preferred embodiment.

One of the sidewall portions of each bracket element desirably includes a locating flange extending outwardly therefrom in a plane perpendicular to the planes of the body of the sidewall portion and of the web portion. These locating flanges extend outwardly from opposite sides and adjacent one end of the bracket in its closed position.

The sidewall portions of the bracket elements have apertures therein for fasteners to extend therethrough to engage associated leg members which are inserted and retained within the bracket elements.

In the preferred construction, the bracket elements each include opposed flanges extending along the outer ends of the sidewall portions and cooperating with the sidewall portions and web portion to define an enclosure therebetween for receiving a leg member. Desirably, these opposed flanges are inclined from the sidewall portions towards the web portion to provide a reduced depth for the enclosure defined therebetween.

The saw buck assembly utilizes a pair of the aforedescribed saw buck brackets and four elongated leg members, each leg member being disposed within a bracket element and having portions thereof extending outwardly of opposed sides of the bracket element. The portions of the legs extending to at least one side of the saw buck brackets are of substantially equal length so as to provide stable seating for the saw buck assembly upon the floor or like surface. Suitable means secures the leg members within the saw buck brackets and brace members extend between the leg members secured in the pair of saw buck brackets to space the saw buck brackets and legs apart. Suitable fastening means secure each brace member to one leg member disposed in a saw buck bracket so that the leg members in each saw buck bracket may be pivoted apart until the fastener means reach the end of travel in the arcuate slots to maintain the saw buck in the erected position with the upper end portions of the leg members spaced to receive a workpiece therebetween.

In the preferred assembly, the opposed flanges on the saw buck brackets are provided and the leg members bias the flanges away from the web portions. Two pairs of brace members extend between the leg members to space the saw buck brackets and legs apart. The upper brace members abut the lower surface of the locating flanges of the bracket elements.

DETAILED DESCRIPTION OF THE ILLUSTRATED EMBODIMENT

Figure 1:
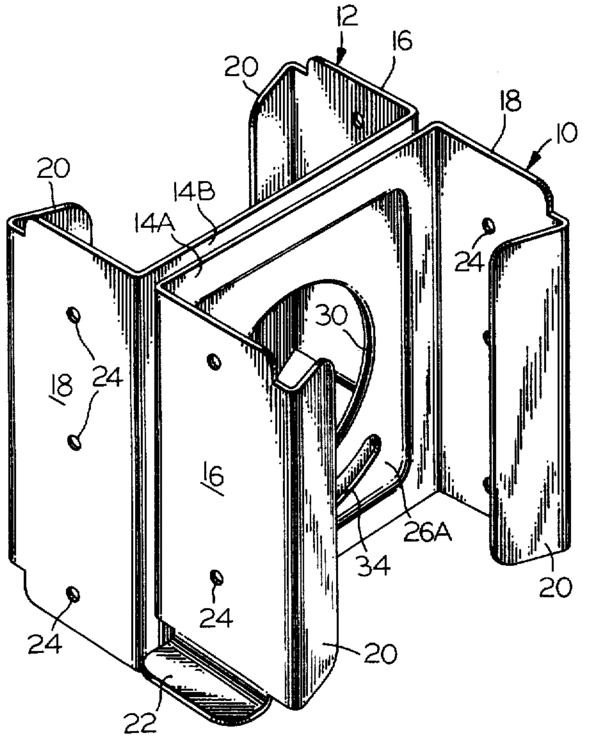
FIG. 1 is a perspective view of a saw buck bracket of the present invention with the two bracket elements in the closed position.
Figure 2:
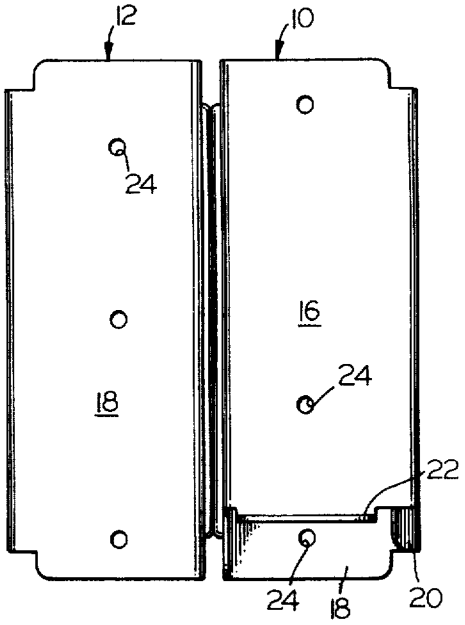
FIG. 2 is a side elevational view thereof.

Turning first to FIGS. 1-9 of the attached drawings, therein illustrated is a saw buck bracket embodying the present invention which is comprised of two bracket elements generally designated by the numerals 10,12 and secured together for relative pivotal movement in a manner which will be described more fully hereinafter. The bracket elements 10,12 are of generally similar construction and configuration except with respect to the pivot construction.

Each bracket element 10,12 has a web portion 14 and a pair of sidewall portions 16,18 extending perpendicularly thereto at two opposite sides thereof. At the free ends of the sidewall portions 16,18 are opposed flanges 20 which are inclined towards the web portion 14 so as to reduce the depth of the enclosure defined between the web portion 14, sidewall portions 16,18 and flanges 20. Since the flanges 20 may be deflected away from the web portion 14, this permits the leg members 42 to be snugly retained within the bracket elements 10,12 prior to the time of permanent fastening despite the normal variations in thickness in wood stock used for the leg members 42. The sidewall portions 16 have an end portion thereof cut and bent outwardly to provide a perpendicularly extending locating flange 22; when the two bracket elements 10,12 are assembled, this provides such locating flanges 22 on opposite sides of the bottom of the bracket as is readily seen in FIGS. 3-6. The sidewall portions 16,18 are also provided with a series of spaced apertures 24 through which fasteners such as nails or screws pass to engage in the leg members 42 to secure them in assembly within the bracket elements 10,12.

Figure 8:
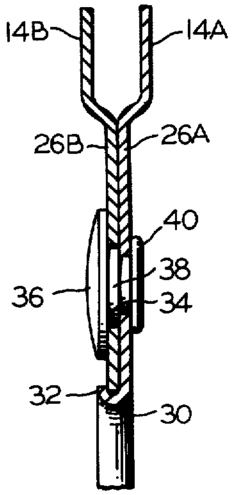
FIG. 8 is a fragmentary sectional view to an enlarged scale along the line 8—8 of FIG. 4.
Figure 9:
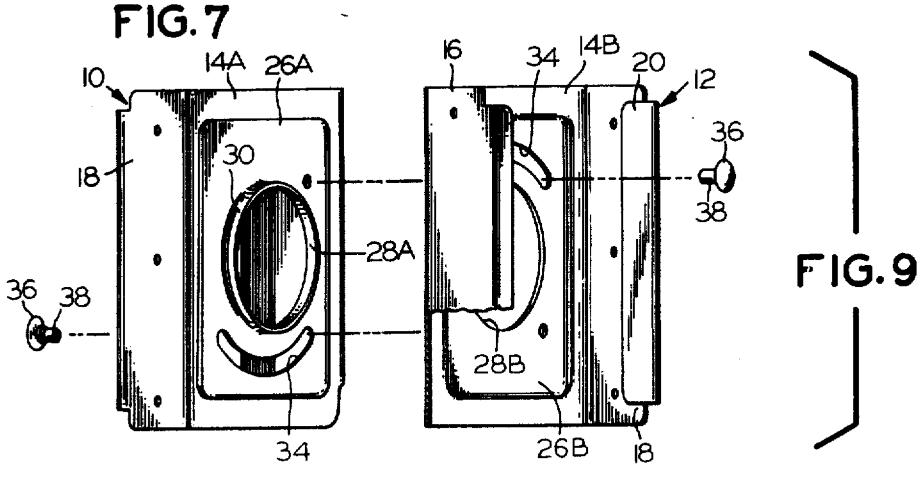
FIG. 9 is a fragmentary exploded view to a reduced scale of the saw buck bracket before deformation of the circular lip and rivets to secure the bracket elements in assembly.
Figure 10:
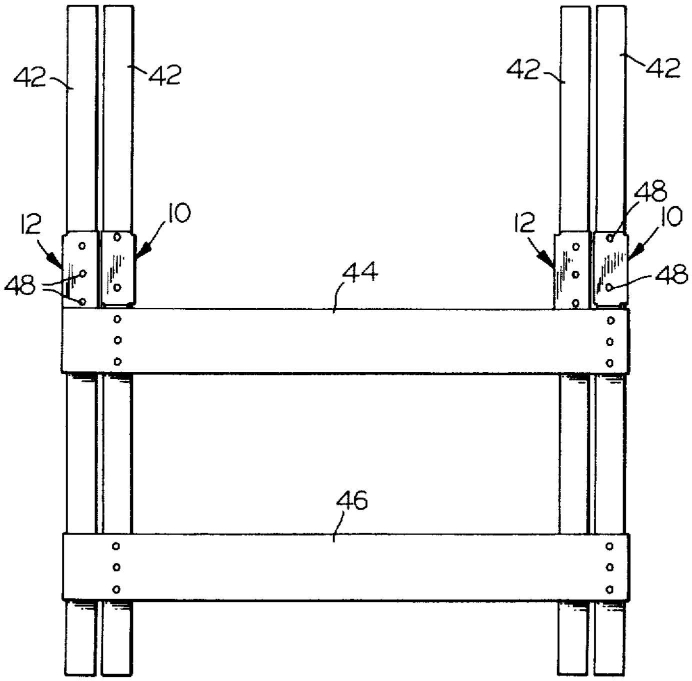
FIG. 10 is a side elevational view of a saw buck assembly employing the brackets of the present invention and with the legs and brackets in the closed position.
Figure 11:
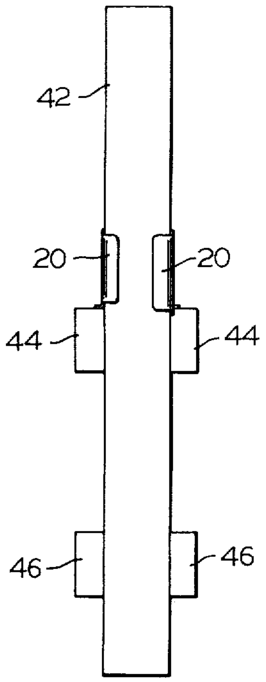
FIG. 11 is an end elevational view thereof.

Turning now to the web portions 14, both bracket elements 10,12 are provided with platform portions 26A,26B which are spaced inwardly from the periphery of the web portions 14A,14B so that the body portion provides a peripheral rib thereabout. Centrally of the web portions 14 are relatively large diameter circular apertures 28A,28B, and, as best seen in FIGS. 8 and 9, the apertures 28A is of lesser diameter than the aperture 28B and the material of the web portion about the aperture 28A is deformed to provide an upstanding circular lip 30 which snugly fits within the aperture 28B. After assembly of the two bracket elements 10,12, the free end of the lip 30 is rolled over to provide a peripheral collar 32 which extends along the surface of the web portion 14B opposite that abutting the web portion 14A to provide a large retaining surface to maintain the bracket elements 10,12 in assembly.

Figure 3:
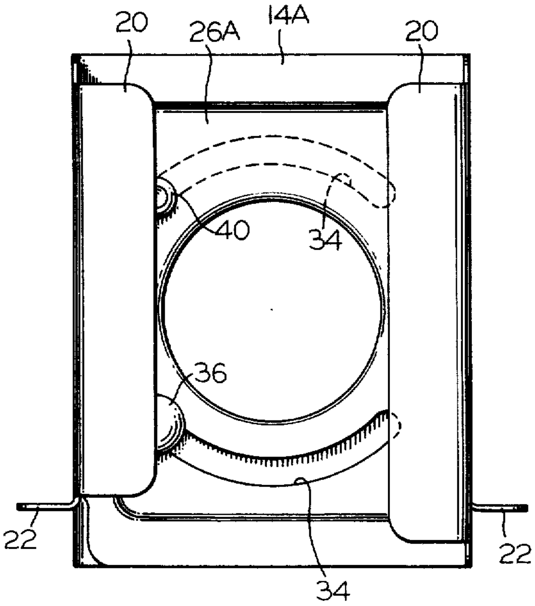
FIG. 3 is a front elevational view thereof.
Figure 4:
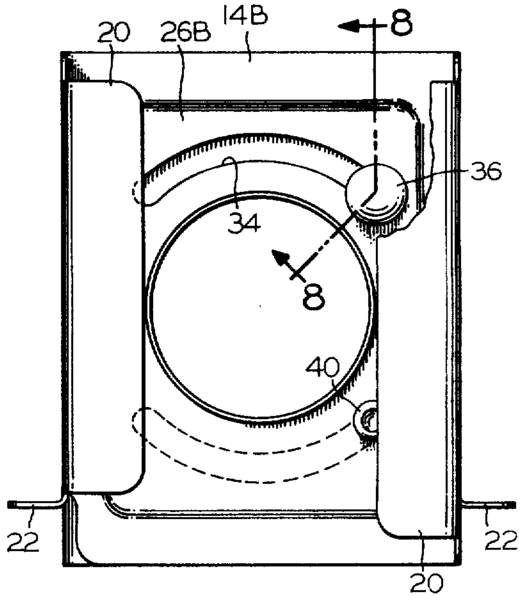
FIG. 4 is a rear elevational view thereof.
Figure 5:
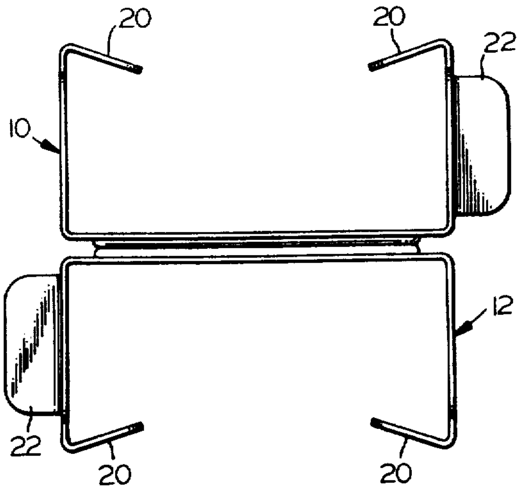
FIG. 5 is a top plan view thereof.
Figure 6:
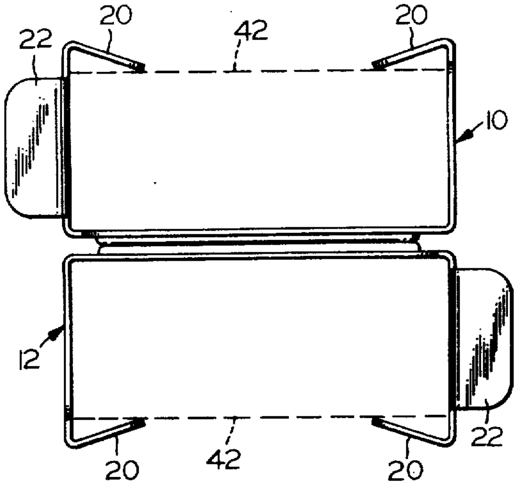
FIG. 6 is a bottom view thereof with the leg members shown in phantom line.
Figure 7:
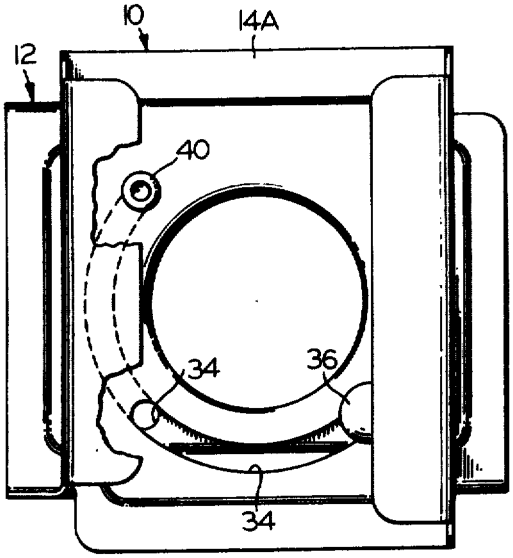
FIG. 7 is a front elevational view similar to FIG. 3 with the bracket elements pivoted into the open position.

The web portions 14 are also provided with arcuate slots 34 having chords which are perpendicular to the sidewall portions 16,18. When the bracket elements 10,12 are assembled, the arcuate slots 34 are disposed adjacent opposite ends of the sidewall portions 16,18 as best seen in FIGS. 3, 4 and 7.

Slidable in each of the slots 34 is a rivet having an enlarged head portion 36 of greater diameter than the width of the slot 34 and a shank portion 38 having a relatively large diameter portion disposed within the slot 34 and a smaller diameter portion seated within an aligned aperture in the web portion 14 of the other bracket element 10,12. Following assembly of the bracket elements 10,12, the free end of the rivet shank 38 is deformed to form a peripheral collar 40 of larger diameter than the aperture in the web portion 14, thereby providing further means for retaining the bracket elements 10,12 in assembly while also retaining the rivet within the arcuate slot 34.

In making a saw buck assembly using the brackets of the present invention, four lengths of wood or like material are cut to substantially uniform length to provide the legs 42. A line is marked on each of the legs 42 at the same distance from what is intended to be the upper end of the legs 42 and this is conveniently at about 12 inches when the leg members 42 are 36 inches in length. Leg members 42 are then inserted into each bracket element 10,12 of a pair of brackets until the bracket elements 10,12 have their upper ends aligned with the marks previously made. The flanges 20 generally will provide frictional resistance to movement of the legs 42 in the bracket elements 10,12 and thereby provide the means for maintaining them in position until nails or like fasteners 48 are driven into the apertures 24 in the sidewall portions 16,18 to secure the leg members 42 in position. To avoid damaging the bracket elements 10,12, it is desirable to effect the nailing operation with the bracket elements 10,12 supported in closed position on a block of wood.

In the preferred embodiment, four brace members 44,46 are cut to equal length, generally about 30 inches. The upper brace elements 44 are located in abutting relationship against the lower surface of the locating flanges 22 of the bracket elements 10,12 and are secured by nails to the legs 42 having the bracket elements 10,12 against which they abut. Thus, each upper brace element 44 will be secured to one leg member 42 of each bracket and will serve as a stop for the other leg member 42 when the bracket elements 10,12 are pivoted to the closed position. The lower brace elements 46 are located at a point spaced from the lower ends of the leg members 42 and are secured by nails 48 to the same leg members 42 as the upper brace elements on that side of the saw buck assembly.

When the saw buck assembly thus produced is placed upon a floor 50 or like surface, the bracket elements 10,12 may be pivoted into the fully opened position about the pivot lip 30. This causes the shanks 38 of the rives to slide within the slots 34 until they reach the opposite end of the slots to produce the condition seen in FIG. 7 where the one bracket element 10 is at 90° to the other bracket element 12. Thus, the leg members 42 of the saw buck assembly define an included angle of 90° in which a log 52 or other workpiece may conveniently be supported for operations such as sawing of the like.

Figure 12:
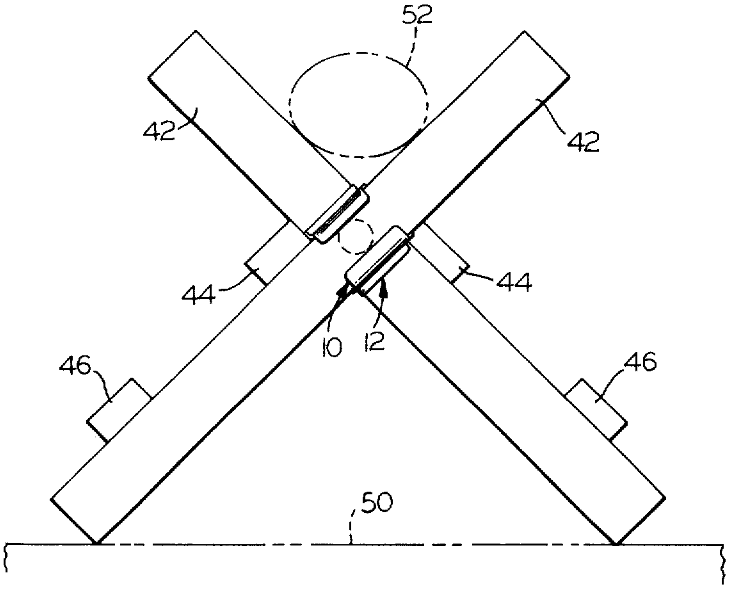
FIG. 12 is an end elevational view with the legs and brackets in the open position and showing in phantom line a log supported thereon.

As can be seen in FIG. 12, the leg members 42 about the brace members 44 secured to the other leg members 42 in the fully opened position so that the saw buck assembly is limited to and held in the open position by the brace members 44 and the limitation on the travel of the rivet shank 38 in the arcuate slot 34.

In the illustrated embodiment, the bracket elements each are provided with the opposed flanges which are inclined towards the web portion so as to define a four-sided enclosure for the wooden studs which will serve as the leg elements. Although it is highly desirable to employ the flanges and even more desirable to employ them in the inclined orientation so as to provide frictional retention of the leg members during the initial assembly, such flanges may be omitted if so desired. Moreover, if so desired, these flanges may be provided with nail holes so that nails may also be driven into the face of the leg members, but such additional fasteners are not necessary when the flanges are employed.

It will be appreciated that the large diameter circular lip and collar provide an extremely large pivot surface for the bracket elements about which the stresses occurring during use may be distributed. Although there is a significant advantage in forming the retaining collar on the lip from the metal of the bracket element, it is possible to employ a separate collar element to effect the locking assembly of the bracket elements which is secured to the lip by suitable means such as welding.

In the bracket of the present invention, it can be seen that the two bracket elements are thus firmly secured in assembly by the rivets which are slidable within the arcuate slots and by the large circular pivot lip. In the open position of the bracket, the rivets are diametrically spaced, as seen in FIG. 7, to provide a highly effective utilization of the several elements for resisting any shearing stresses. The provision of the platforms in the web portions provides the means for accomodating the head and collar of the rivets and the collar of the pivot at or below the plane defined by the peripheral rib comprising the plane of the body of the web portion. Thus, when the leg members are inserted into the bracket elements, they slide along and then bear firmly against the planar surface of the body of the web portions.

The saw buck brackets of the present invention offer significant advantages from the standpoint of ease of assembly in that the user is required to possess only a saw, hammer, nails and some means for ensuring the equal spacing of the brackets from the several legs. The assembly operation is simple, rigid and relatively foolproof by reason of the structural features of the brackets.

Thus it can be seen from the foregoing detailed description and accompanying drawings, that the saw buck bracket of the present invention is one which may be simply and economically fabricated and which is rugged in construction to provide a relatively long life. The saw buck brackets may be assembled with wooden members simply and conveniently to provide a rugged saw buck assembly which will stably support various workpieces.

Having thus described the invention, I claim:

1. A saw buck bracket comprising

A. a pair of bracket elements each having:

1. a web portion, the bracket elements having their web portion disposed in abutting surface contact;
2. parallel sidewall portions extending perpendicularly to the web portion along two opposite sides thereof, the sidewall portions of the two bracket elements being generally aligned in the closed position of the bracket, said web portions of said bracket elements each having an arcuate slot therein, the chord of said slot extending perpendicularly to said sidewall portions, the slots of the bracket elements being disposed adjacent opposite ends of the sidewall portions so that the arcs extend towards each other, said web portions also having axially aligned circular apertures centrally thereof, one bracket web portion having a circular aperture of lesser diameter than the circular aperture of the other web portion and further having an axially extending lip of circular cross section formed about the aperture therein and extending through the aperture of the other bracket web portion, said lip having a collar on the free end thereof extending along the surface of said other bracket web portion opposite that abutting said one bracket web portion; and B. a pair of fastener means, each fastener means being fixedly seated in one of the bracket web portions and having a shank portion extending through the arcuate slot of the other bracket web portion and slidable therein, said fastener means each having an end portion larger than the width of the cooperating slot so as to bear upon the surface of the web portion about the slot and thereby retain the bracket elements in assembly.

2. The saw buck bracket in accordance with claim 1 wherein said web portions of said bracket elements have platform portions extending above the plane of the body of the web portion adjacent the intersections with the sidewall portions, the platform portions of said bracket elements providing the abutting bearing surfaces therefor.

3. The saw buck bracket in accordance with claim 2 wherein said platform portion is of generally rectangular configuration and the body provides a peripheral rib thereabout.

4. The saw buck bracket in accordance with claim 2 wherein the height of said platform portion is equal at least to the height dimension of the associated head and collar of the fastener means and the height dimension of the collar on the associated lip so that said collars and head do not protrude above the plane defined by the body of said web portions.

5. The saw buck bracket in accordance with claim 1 wherein said axially extending lip on said one bracket portion snugly fits within the circular aperture of the other web portion and wherein said collar thereon abuts the surface of the bracket web portion so as to retain said bracket elements in tight fitting assembly.

6. The saw buck bracket in accordance with claim 5 wherein said collar is of annular configuration.

7. The saw buck bracket in accordance with claim 1 wherein one of the sidewall portions of each bracket element includes a locating flange extending outwardly therefrom in a plane perpendicular to the planes of the body of the sidewall portion and of the web portion, said locating flanges extending outwardly from opposite sides and adjacent one end of said bracket in the closed position thereof.

8. The saw buck bracket in accordance with claim 1 wherein said sidewall portions of said bracket elements have apertures therein for fasteners to extend therethrough to engage leg members inserted into said bracket elements.

9. The saw buck bracket in accordance with claim 1 wherein said bracket elements each include opposed flanges extending along the outer ends of said sidewall portions cooperating with said sidewall portions and web portion to define an enclosure therebetween for receiving a leg member.

10. The saw buck bracket in accordance with claim 9 wherein said opposed flanges on the outer ends of said sidewall portions are inclined from the sidewall portions towards the web portion to provide a reduced depth for the enclosure defined therebetween.

11. A saw buck assembly comprising:

A. a pair of saw buck brackets each including:
   1. a pair of bracket elements each having:
      (a) a web portion, the bracket elements having their web portions disposed in abutting surface contact;
      (b) parallel sidewall portions extending perpendicularly to the web portion along two opposite sides thereof, the sidewall portions of the two bracket elements being generally aligned in the closed position of the bracket;
      said web portions of said bracket elements each having an arcuate slot therein, the chord of said slot extending perpendicularly to said sidewall portions, the slots of the bracket elements being disposed adjacent opposite ends of the sidewall portions so that the arcs extend towards each other, said web portions also having axially aligned circular apertures centrally thereof, one bracket web portion having a circular aperture of lesser diameter than the circular aperture of the other web portion and further having an axially extending lip of circular cross section formed about the aperture therein and extending through the aperture of the other bracket web portion, said lip having a collar on the free end thereof extending along the surface of said other bracket web portion opposite that abutting said one bracket web portion; and
   2. a pair of fastener means, each fastener means being fixedly seated in one of the bracket web portions and having a shank portion extending through the arcuate slot of the other bracket web portion and slidable therein, said fastener means each having an end portion larger than the width of the cooperating slot so as to bear upon the surface of the web portion about the slot and thereby retain the bracket elements in assembly, the saw buck brackets having their apertures axially aligned;

B. four elongated leg members, each leg member being disposed within a bracket element and having portions thereof extending outwardly of opposed sides of said bracket element, the portions of said legs extending to at least one side of said saw buck brackets being of substantially equal length so as to provide stable seating for the saw buck assembly upon the floor or like surface;

C. means securing said leg members within said saw buck brackets;

D. brace members extending between the leg members secured in the pair of saw buck brackets to space said saw buck brackets and legs apart; and E. fastening means securing each brace member to one leg member disposed in each saw buck bracket, whereby the leg members in each saw buck bracket may be pivoted apart until the fastener means reach the end of travel in said arcuate slots to maintain said saw buck in the erected position with the upper end portions of said leg members spaced to receive a workpiece therebetween.

12. The saw buck assembly in accordance with claim 11 wherein said saw buck bracket elements each have opposed flanges extending along the outer ends of said sidewall portions and cooperating with said sidewall portions and web portion to define an enclosure therebetween, said opposed flanges bearing upon the surface of the leg member received within the bracket element.

13. The saw buck assembly in accordance with claim 12 wherein said opposed flanges are inclined from the sidewall portions towards the web portions to provide a reduced depth for the enclosure therebetween, said leg members biasing said flanges away from said web portions.

14. The saw buck assembly in accordance with claim 11 wherein two pairs of brace members extend between the leg members secured in the pair of saw buck brackets to space said saw buck brackets and legs apart.

15. The saw buck assembly in accordance with claim 11 wherein said saw buck bracket elements each have one sidewall portion provided with a locating flange extending outwardly therefrom in a plane perpendicular to the planes of the body of the sidewall portion and of the web portion, the locating flanges of a bracket extending outwardly from opposite sides and at the lower end thereof when said bracket is in the closed position, said first mentioned brace members abutting against the lower surface of said locating flanges.

* * * * *